United States Patent [19]

Stöhr

[11] Patent Number: 5,058,232
[45] Date of Patent: Oct. 22, 1991

[54] SCRAPING ARRANGEMENT FOR TELESCOPIC STEEL COVERS

[75] Inventor: Albert Stöhr, Schwaben, Fed. Rep. of Germany

[73] Assignee: Gebr. Hennig GmbH, Fed. Rep. of Germany

[21] Appl. No.: 150,656

[22] PCT Filed: May 13, 1987

[86] PCT No.: PCT/EP87/00250
§ 371 Date: Oct. 19, 1990
§ 102(e) Date: Oct. 19, 1990

[87] PCT Pub. No.: WO87/06866
PCT Pub. Date: Nov. 19, 1987

[30] Foreign Application Priority Data

May 13, 1986 [DE] Fed. Rep. of Germany ............ 8613005.6[U]

[51] Int. Cl.⁵ .................. B23Q 11/08; F16C 17/00
[52] U.S. Cl. ................... 15/236.01; 15/256.5; 277/24; 277/181; 277/199; 277/215; 384/16
[58] Field of Search ............. 277/193, 194, 199, 24, 277/215, 12, 207 R, 181, 199; 384/15, 16; 49/484, 494; 15/236.01, 256.5

[56] References Cited

U.S. PATENT DOCUMENTS

| 1,595,890 | 8/1926 | Taylor | 277/194 |
| 1,986,465 | 1/1935 | Dempsey | 277/199 |
| 2,834,616 | 5/1958 | Gebert et al. | |
| 3,029,480 | 4/1962 | Signorelli et al. | 49/484 V |
| 3,134,601 | 5/1964 | Hager | 277/193 V |
| 3,159,182 | 12/1964 | Peters | |
| 3,602,651 | 9/1971 | Weber | 384/16 |
| 3,785,418 | 1/1974 | Hennig et al. | |
| 3,871,668 | 3/1975 | Coker et al. | 277/199 X |
| 4,254,531 | 3/1981 | Hennig et al. | |
| 4,447,929 | 5/1984 | Hennig et al. | |
| 4,487,421 | 12/1984 | Housas et al. | 277/207 R X |
| 4,722,452 | 2/1988 | Hennig et al. | |

FOREIGN PATENT DOCUMENTS

| 1803448 | 5/1970 | Fed. Rep. of Germany . |
| 2937307 | 4/1981 | Fed. Rep. of Germany . |
| 135462 | 5/1979 | German Democratic Rep. . |
| 545437 | 3/1942 | United Kingdom . |
| 2094677 | 9/1982 | United Kingdom . |

Primary Examiner—Allan N. Shoap
Attorney, Agent, or Firm—Learman & McCulloch

[57] ABSTRACT

The invention relates to a scraper construction for telescopic steel covers comprising a metal carrier strip and an elastic scraper body. The cross-sectional configurations of the scraper body and the carrier strip are such that the latter is accommodated in a groove of the scraper body and the latter has retaining limbs that may be clamped between the carrier and a cover on which the carrier is secured.

8 Claims, 2 Drawing Sheets

SCRAPING ARRANGEMENT FOR TELESCOPIC STEEL COVERS

The invention relates to a scraper construction for telescopic steel covers.

A scraper of the general class to which the invention relates is disclosed in German Offenlegungsschrift No. 18 03 448.5. That scraper has two inwardly directed retaining projections of uniform thickness behind which the two outer arms of the carrier strip engage. Just like the top wall of the steel cover, the carrier strip is provided with recesses which serve to receive connecting elements, for example tightening pins.

The object of the invention is to improve the known scraper construction in such a way that with very simple production and assembly a particularly reliable seating of the scraper is ensured.

Two embodiments of the invention are illustrated in the drawings, in which.

Figure 1:
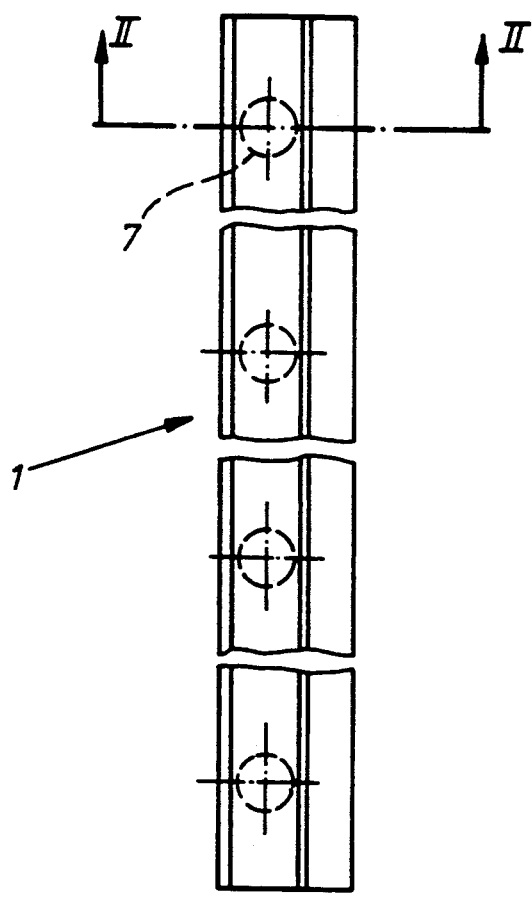
FIG. 1 shows a plan view of a scraper constructed according to the invention.
Figure 2:
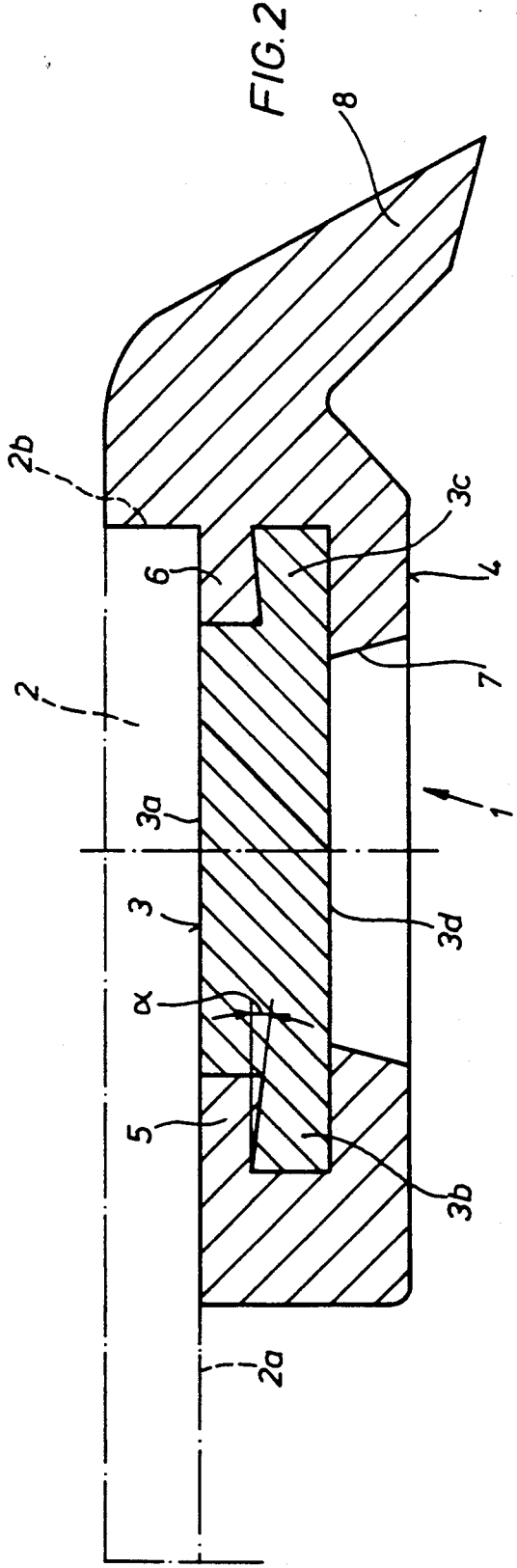
FIG. 2 shows a section along the line II—II of FIG. 1.

The scraper construction shown in FIGS. 1 and 2 is intended for use with a telescopic steel cover composed of a plurality of telescoping boxes of which only the top wall 2 of a cover box is indicated by broken lines in FIG. 2.

The scraper construction 1 includes a metal carrier strip 3 which has a T-shaped outer cross-sectional profile and rests with the base surface 3a of the T on the underside 2a of the top wall 2 of the cover box near the front edge 2b of this top wall.

The scraper construction 1 also includes a scraper body 4 which is made from flexible and elastic material and has a groove in one surface thereof with an inner cross-sectional profile adapted to the outer cross-sectional profile of the carrier strip 3. The groove has a central portion from which two recesses extend in opposite directions and form two retaining limbs 5, 6 on opposite sides of the groove which overlie or nest with the two outer arms 3b, 3c of the carrier strip 3.

In the embodiment illustrated in FIGS. 1 and 2 the thickness of the two retaining limbs 5, 6 of the scraper body 4 increases continuously and uniformly from the interior towards the exterior at an angle $\alpha$ which is between 2 and 15°, preferably between 3° and 8°, for example 5°.

The surface of the scraper body 4 butting against the underside 3d of the carrier strip 3 is provided at intervals with cut-outs or openings 7 which serve to make the connection between the carrier strip 3 and the cover box 2.

At that side of the scraper body 4 projecting over the front edge 2b of the top wall 2 is a scraping lip 8 which rests on the upper surface of the top wall of the next smaller cover box of the telescopic steel cover. The cross-sectional profile of the scraper body 4 is dimensioned so that the scraper body can be elastically deformed to enable the carrier strip 3 to be accommodated in the groove. The elasticity of the body material causes the body to grip the carrier strip so as to lock thereon positively and with elastic pressure.

The scraper construction 1 is set up as follows:

First of all the scraper body 4 is fitted onto the carrier strip 3. Then the assembly thus produced is fixed on the top wall 2 of the cover box and the carrier strip 3 is spot-welded to the top wall 2. The cut-outs 7 provided in the scraper body 4 facilitate access for the welding electrode to the underside 3d of the metal carrier strip 3.

In the production of the welded connection between the carrier strip 3 and the top wall 2 the carrier strip 3 is brought near to the top wall 2 and the retaining limbs 5 and 6 of the scraper blade 4 are clamped between the arms 3b, 3c of the carrier strip 3 and the top wall 2 of the cover box. In this way it is ensured that the scraper body 4 is clamped reliably on the carrier strip 3 and it is absolutely secure against unintentional release of the scraper blade 4 during operation of the steel cover.

Figure 3:
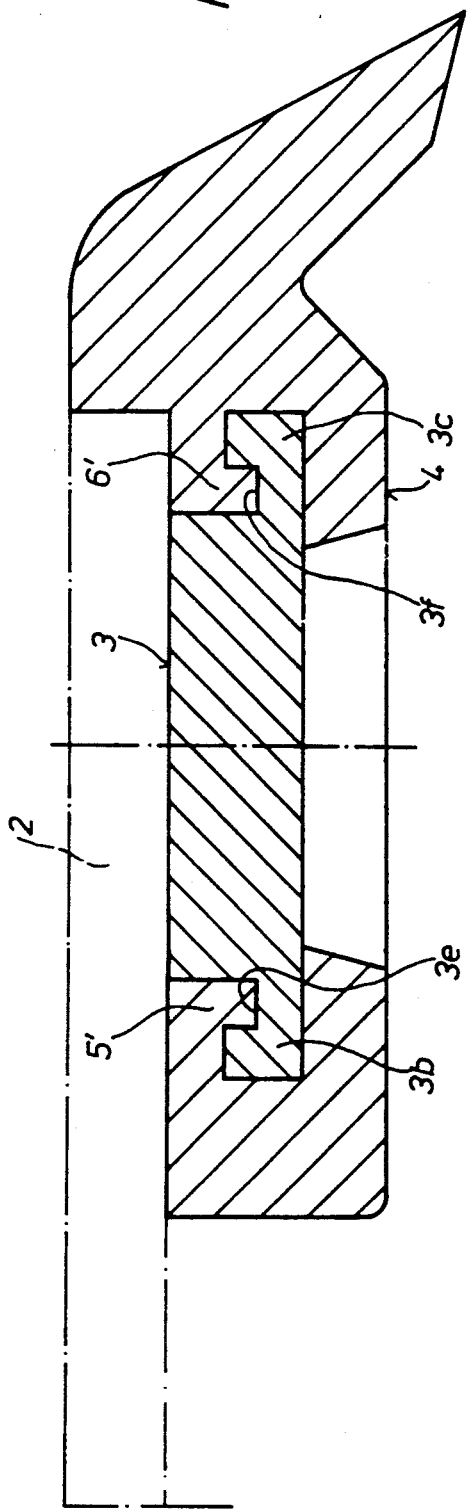
FIG. 3 shows a section (corresponding to FIG. 2) of a variant.

In the embodiment illustrated in FIG. 3 the same parts are designated by the same reference numerals as in FIGS. 1 and 2. This variant differs in the design of carrier arms 3b, 3c and the retaining limbs 5', 6' of the scraper 4. The arms 3b, 3c have notches 3e, 3f at their inner ends and the limbs 5', 6' have enlargements which are accommodated in the adjacent notches. The carrier arms and the scraper body thus are L-shaped in configuration and nest with one another. As a result of this construction the limbs 5', 6' are thickest at their inner edges.

The scraper construction according to FIG. 3 is set up in the same way as in the construction according to FIGS. 1 and 2. Here, too, after the connection has been made between the carrier strip 3 and the top wall 2 it is ensured that the scraper body 4 is set particularly reliably on the carrier strip 3.

In a variant of the embodiments shown in FIGS. 1 to 3 the rear end face of the scraper body 4 opposite from the scraping lip 8 (i.e. the left-hand end face in FIGS. 2 and 3) can be profiled, for example with projection 9 in the form of waves, ribs or knobs. These projections act as elastic bumpers for the next smaller cover box which with a stop projecting upwards over its top wall comes to rest at the end of its extending movement on the rear end face of the scraper body 4 of the next larger cover box. By elastic deformation of these projections on the rear end face of the scraper a very desirable cushioning and damping of the stop operation is achieved.

I claim:

1. A scraper construction adapted to be secured to a support, said scraper construction comprising a carrier T-shaped in cross-section and having a central body presenting uninterrupted underside and topside planar surfaces, the topside surface of which is adapted to confront said support, said carrier having two arms extending in opposite directions from said central body; and a scraper body having opposite sides between which is a T-shaped groove, said groove comprising a central portion from which two recesses extend in opposite directions toward the respective opposite sides to form retaining limbs on opposite sides of said groove, one of said sides of said scraper body terminating in a scraper lip, said carrier being snugly accommodated in said groove with the central body of said carrier occupying said central portion of said groove, the topside surface of the central body of said carrier being exposed via said groove, and the arms of said carrier being accommodated in said recesses, the arms of said carrier terminating in free ends and being of varying thickness with their maximum thickness at said free ends, said recesses corresponding to the cross-sectional configuration of said arms, said scraper body having an opening extending therethrough in communication with said groove and exposing a portion of said underside planar surface of said central body of said carrier to permit access to said carrier for fixing said topside planar surface of said central body of said carrier to said support, thereby to effect clamping of the limbs of said scraper body between the arms of said carrier and said support, said scraper body carrying projections on that side of said scraper body opposite said one of said sides.

2. The construction according to claim 1 wherein said scraper body is formed of elastic material.

3. The construction according to claim 1 wherein the thickness of said arms increases substantially uniformly toward said free ends at an angle of between about 2° and 15°.

4. The construction according to claim 1 wherein the thickness of said arms increases substantially uniformly toward said free ends at an angle of between about 3° and 8°.

5. The construction according to claim 1 wherein said arms are L-shaped.

6. The construction according to claim 1 wherein the cross-sectional configuration of said arms and said limbs is complementary.

7. The construction according to claim 6 wherein the thickness of said arms increases in a direction toward said free ends and the thickness of said limbs decreases in a direction toward said free ends.

8. The construction according to claim 1 wherein said scraper body is sufficiently elastic to enable it to be applied to said carrier by passing said carrier into said groove.

* * * * *